Sept. 29, 1925. 1,555,239
F. A. A. ESSMANN
WEIGHING DEVICE
Filed July 23, 1923 10 Sheets-Sheet 2
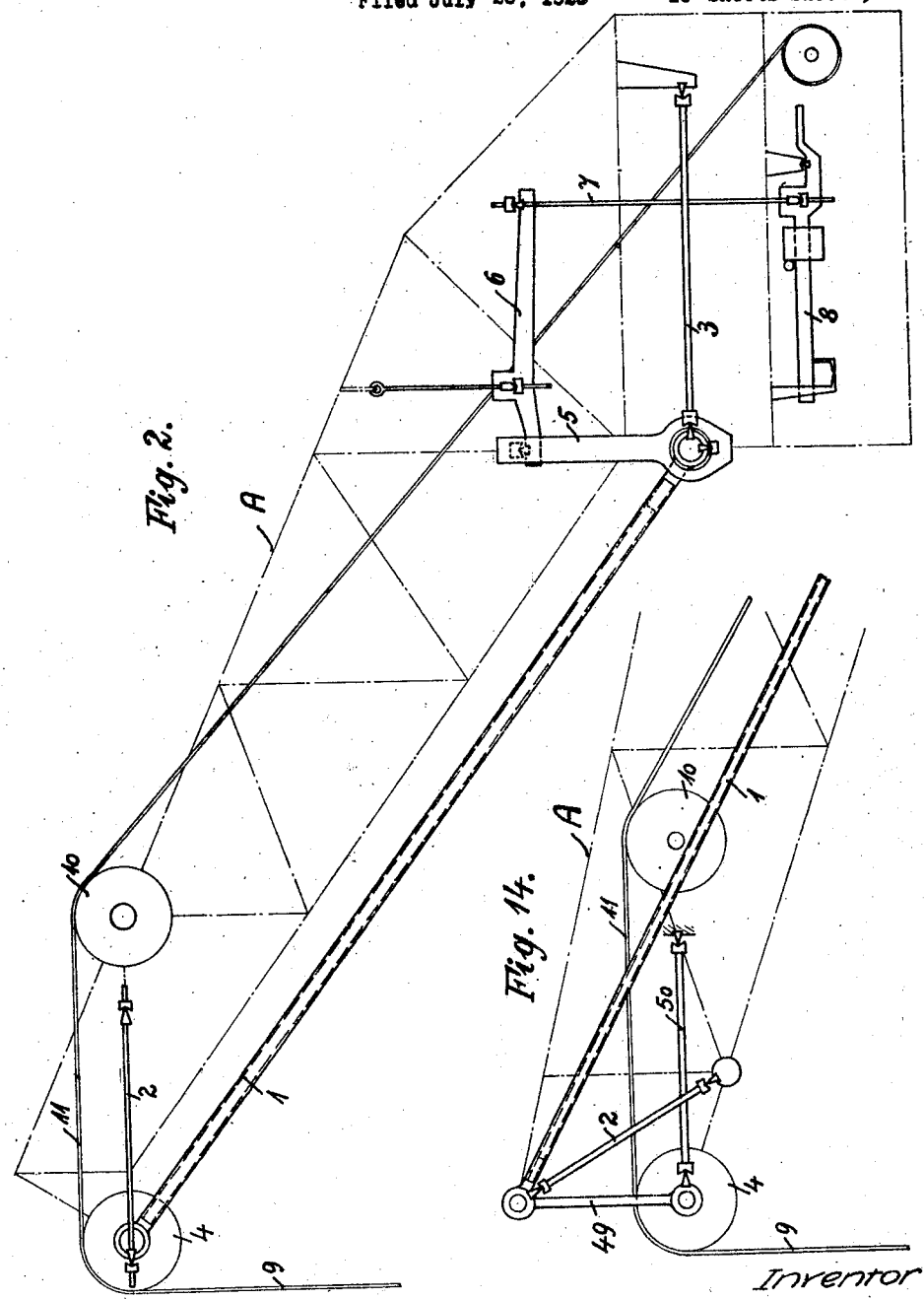
Inventor
F.A.A.Essmann
by Langner, Parry, Card & Langner
Attys.

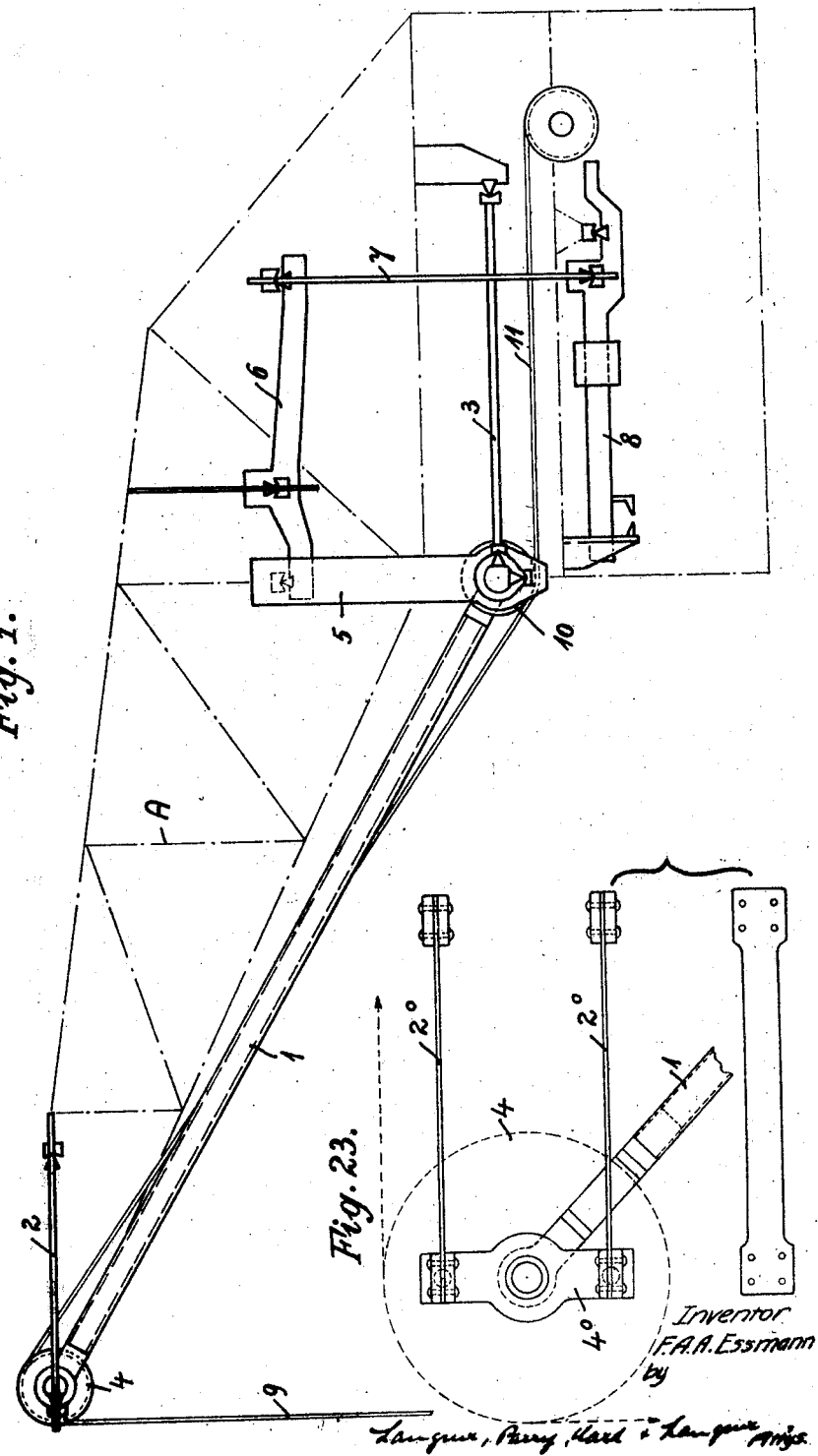

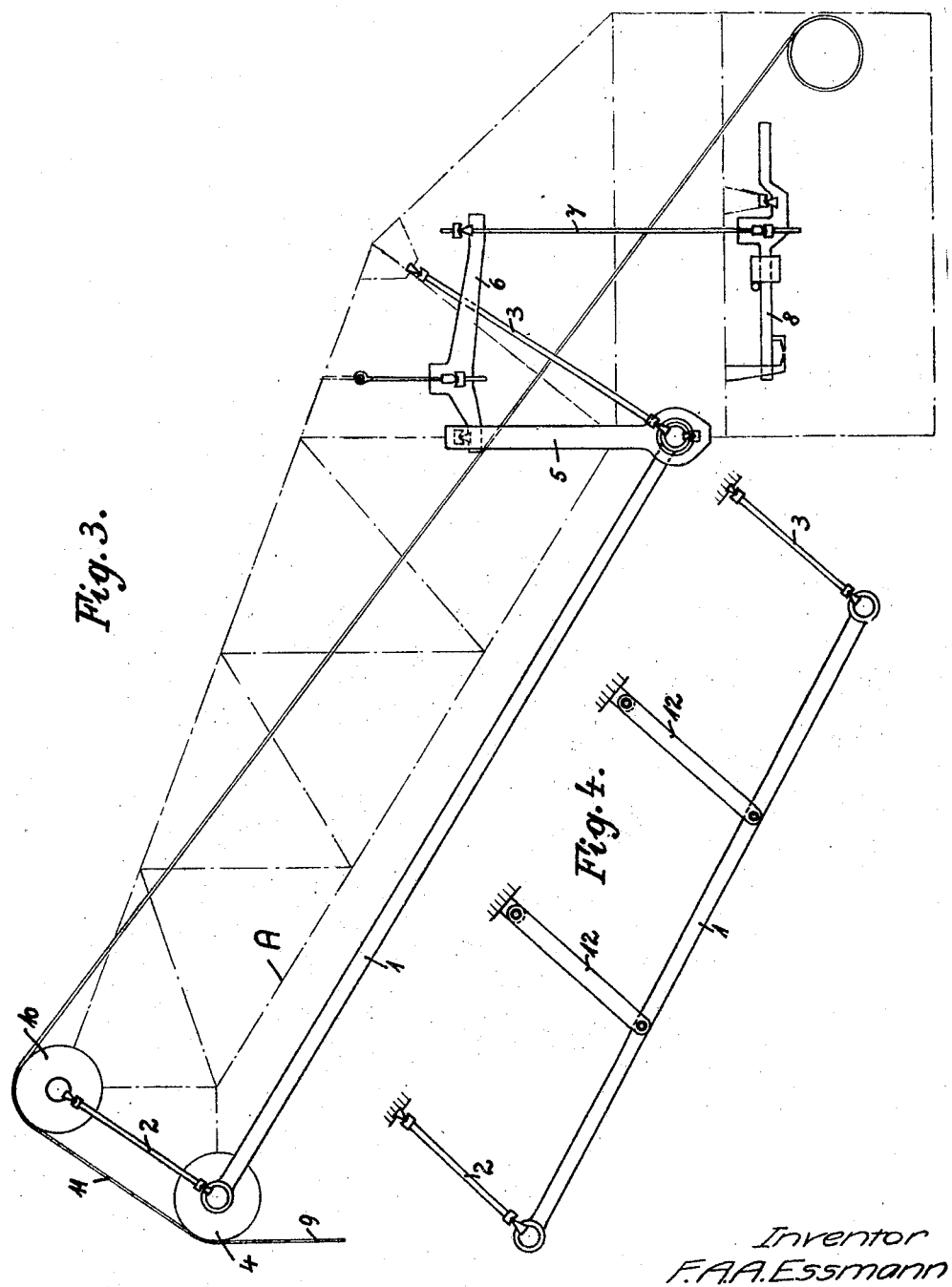

Sept. 29, 1925.
F. A. A. ESSMANN
WEIGHING DEVICE
Filed July 23, 1923 10 Sheets-Sheet 4
1,555,239
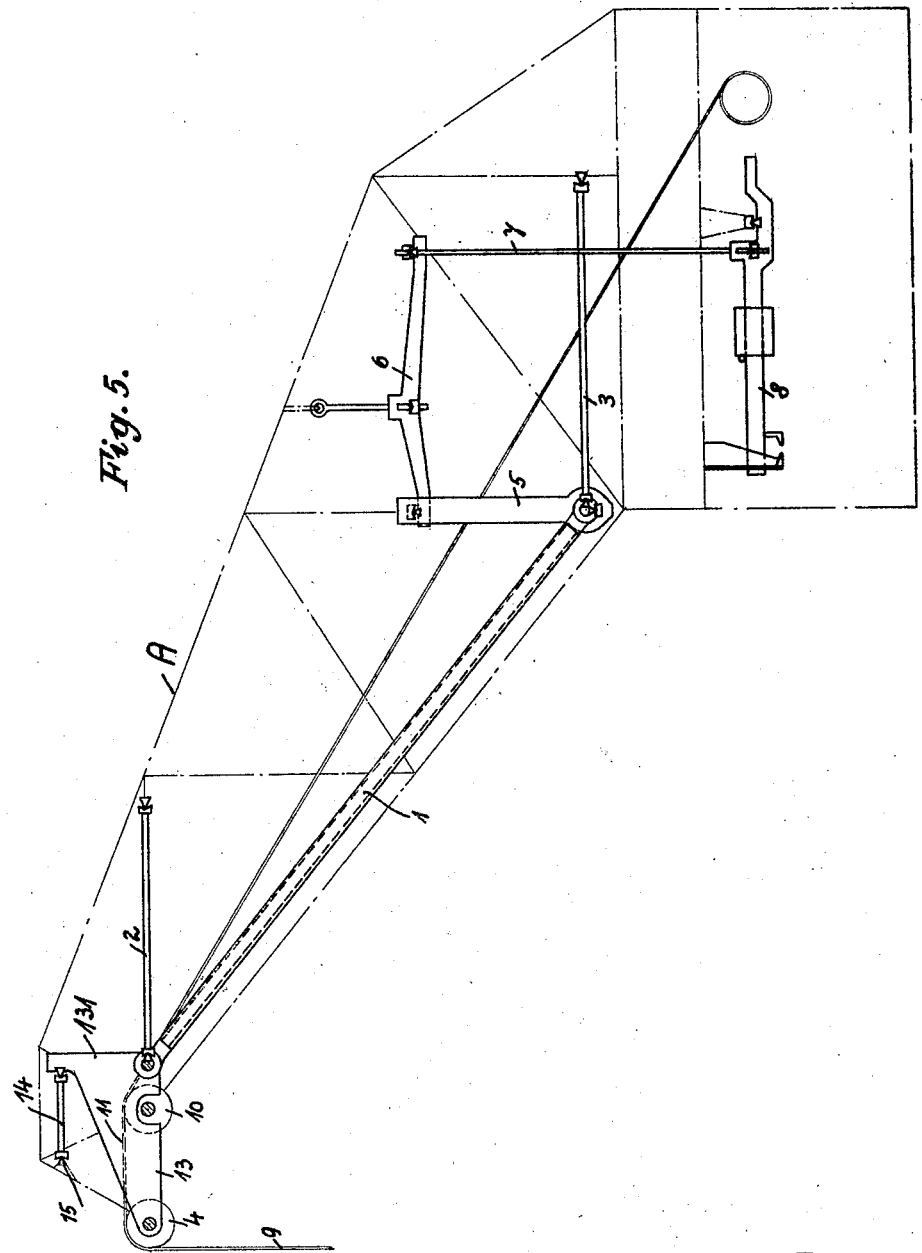
Inventor
F.A.A. Essmann

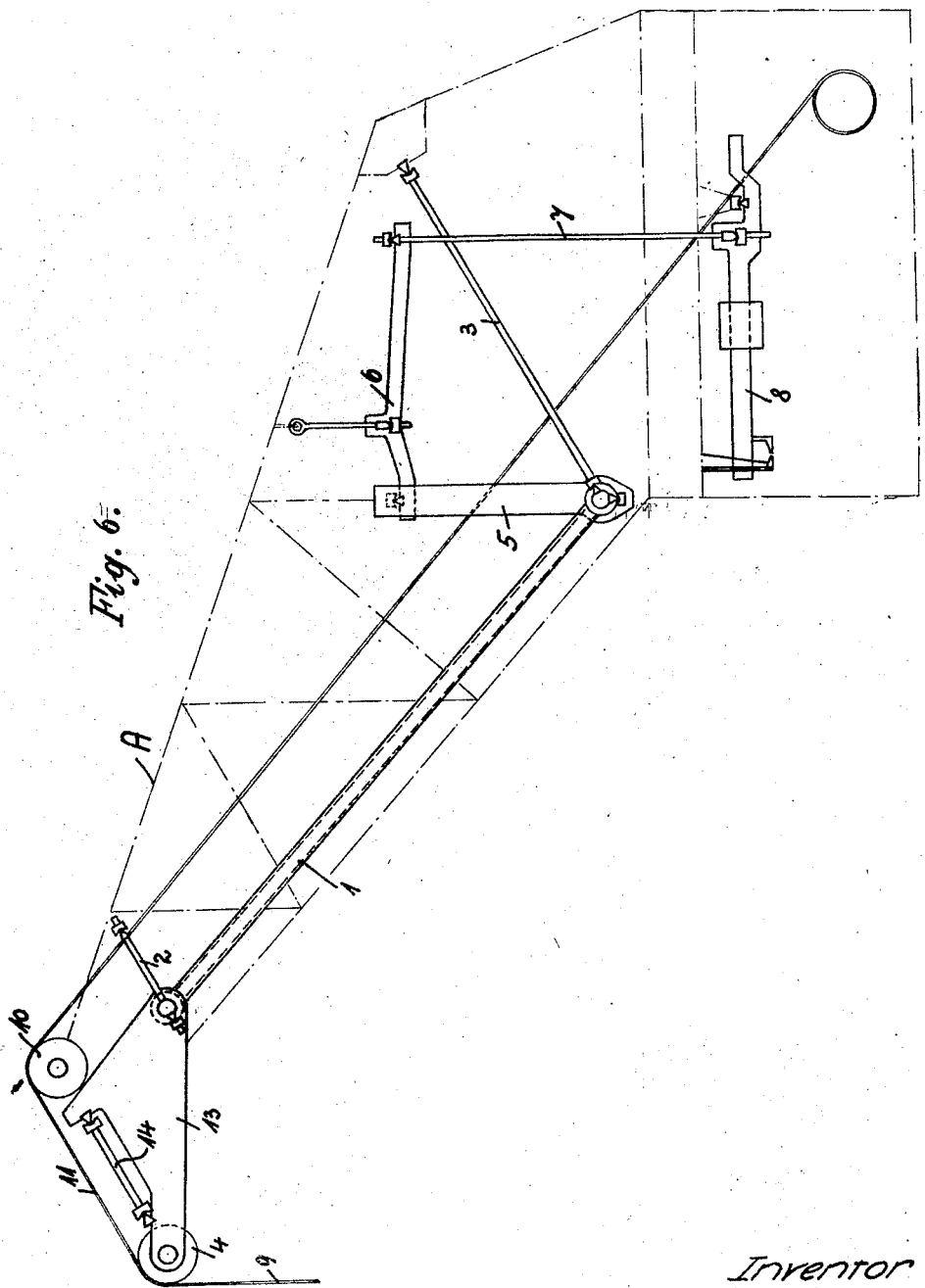

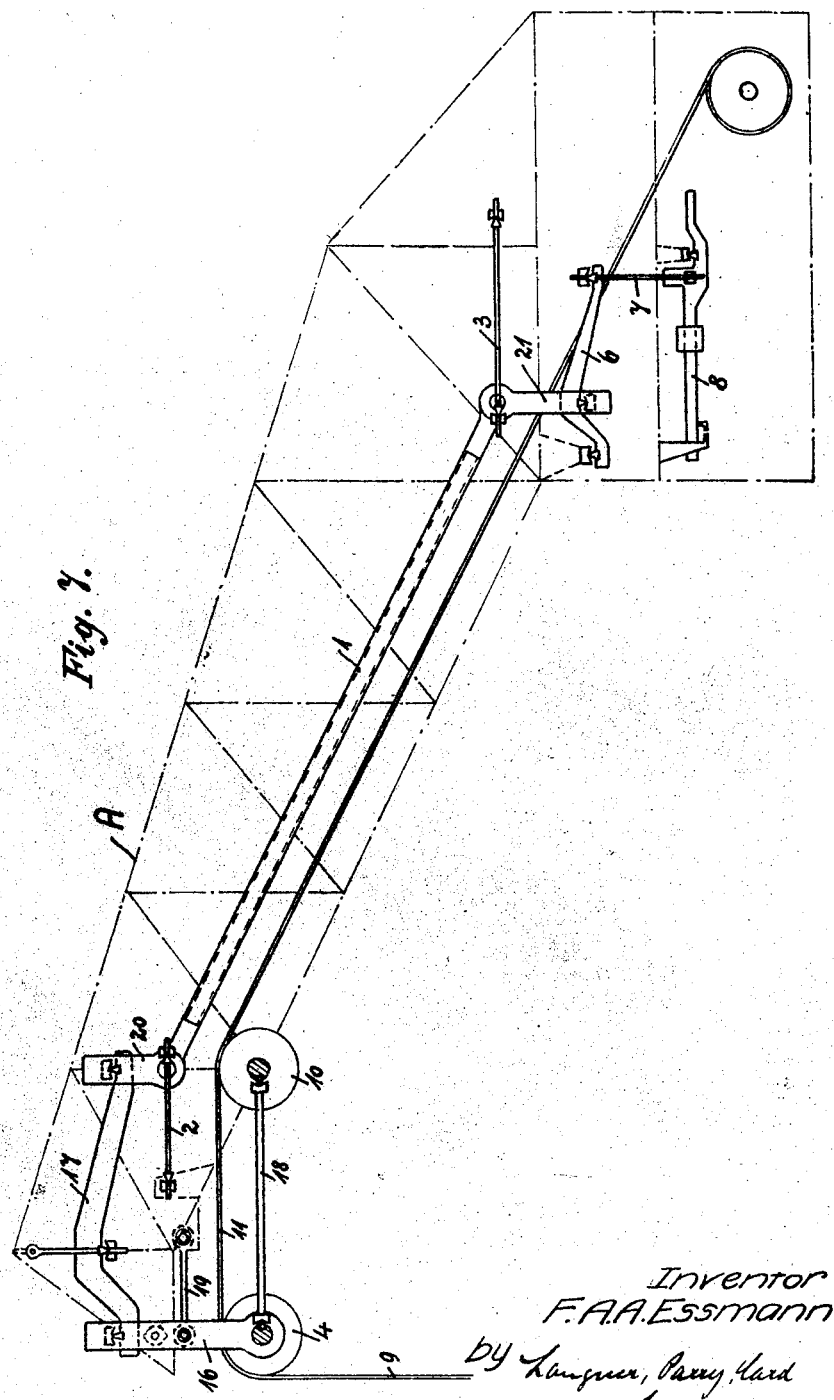

Sept. 29, 1925.
F. A. A. ESSMANN
1,555,239
WEIGHING DEVICE
Filed July 23, 1923    10 Sheets-Sheet 7
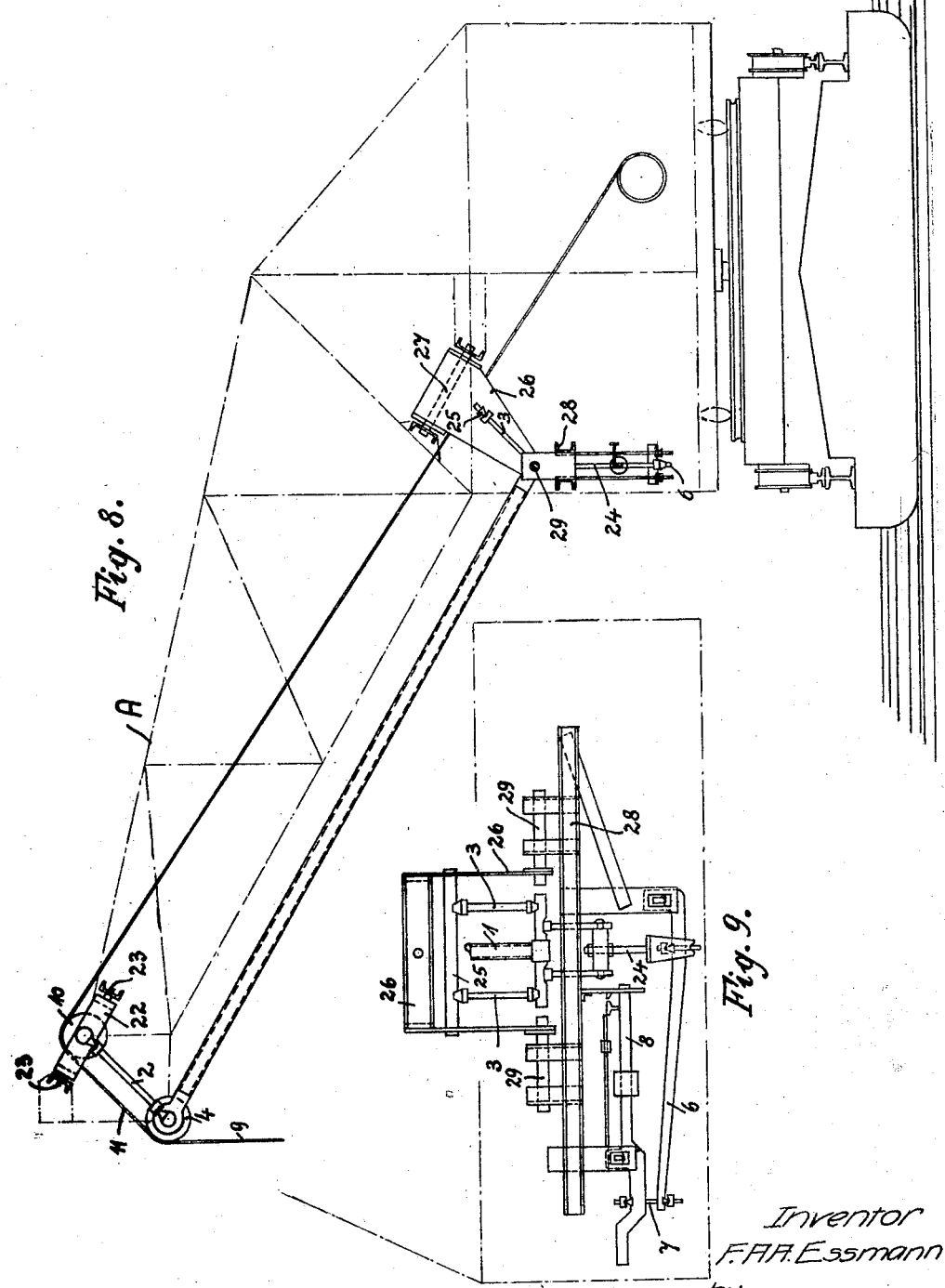
Inventor
F.A.A.Essmann
by
Langner, Parry, Card & Langner
Attys

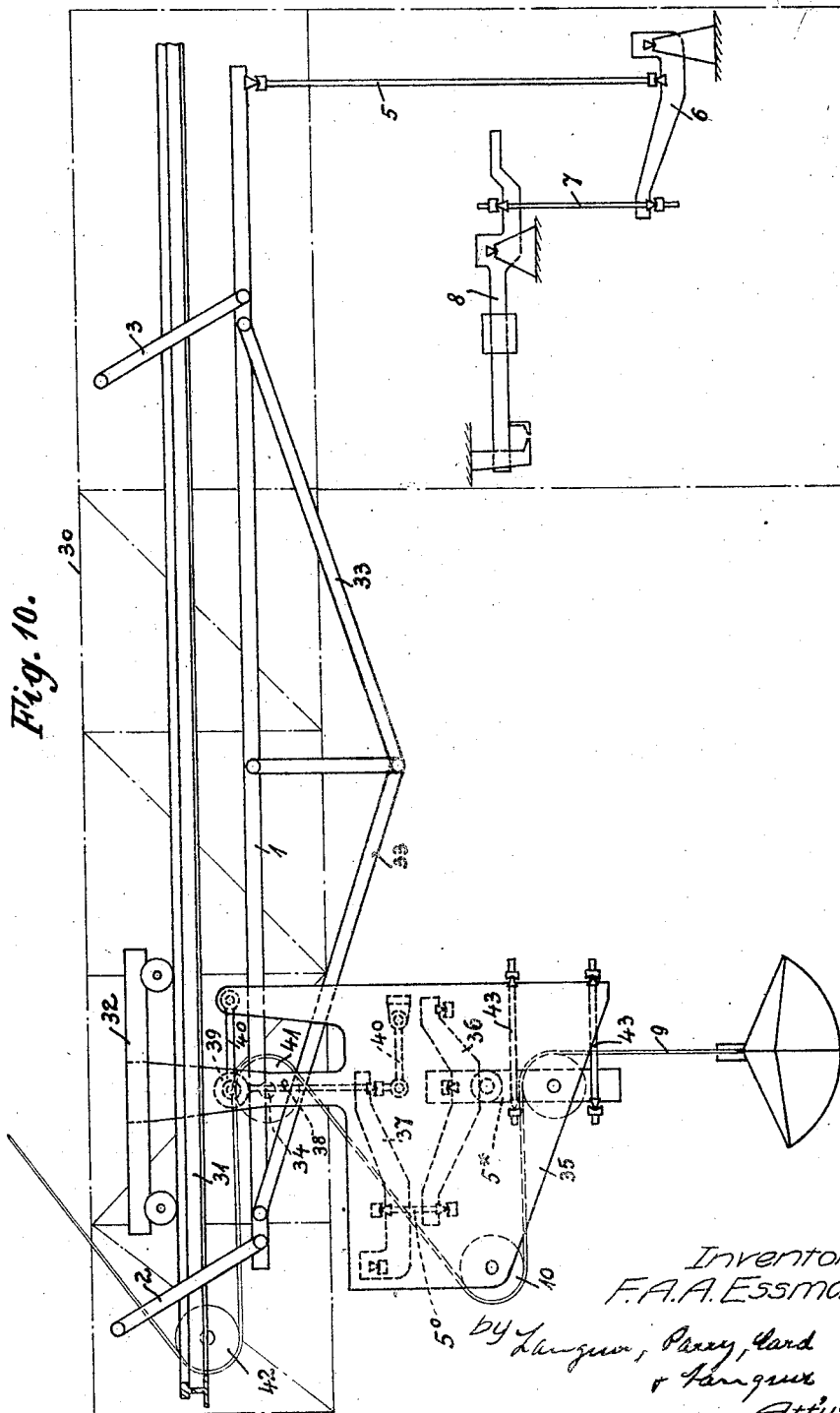

Sept. 29, 1925.  
F. A. A. ESSMANN  
WEIGHING DEVICE  
Filed July 23, 1923     10 Sheets-Sheet 9  
1,555,239
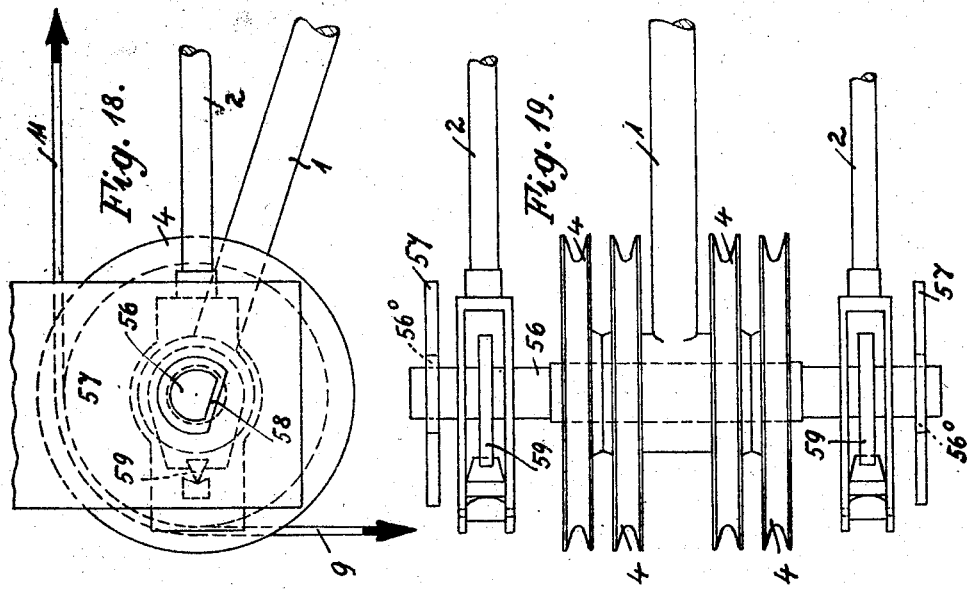
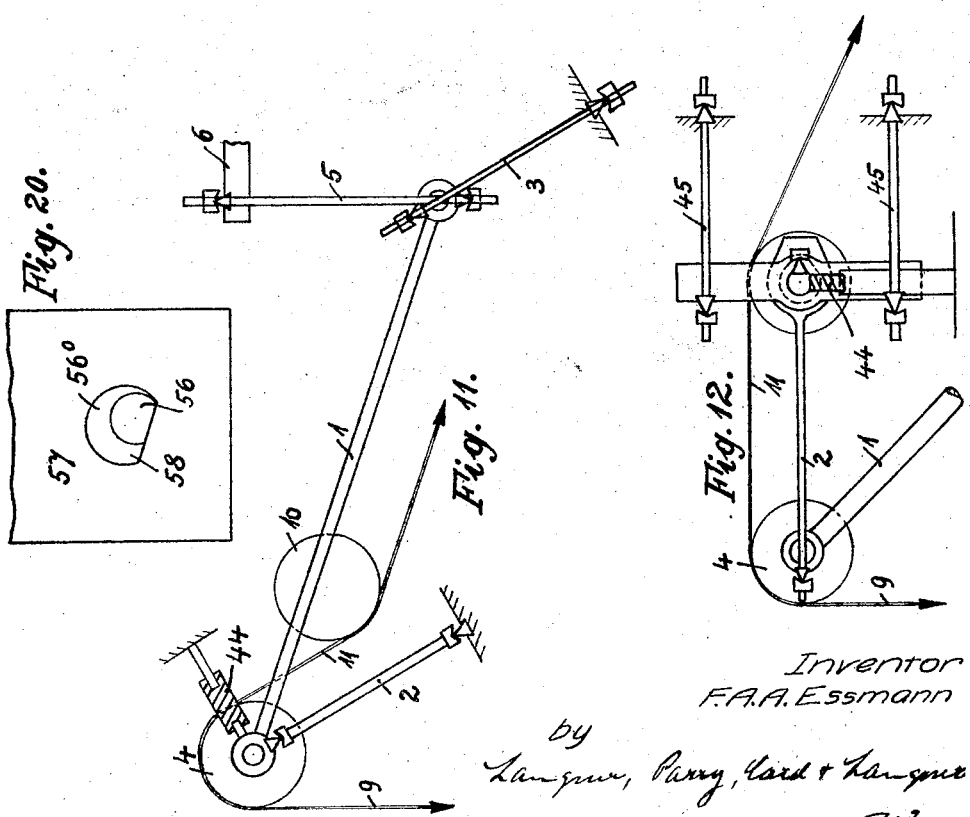
Inventor  
F.A.A. Essmann  
by  
Langner, Parry, Card & Langner  
Attys.

Sept. 29, 1925. 1,555,239
F. A. A. ESSMANN
WEIGHING DEVICE
Filed July 23, 1923 10 Sheets-Sheet 10
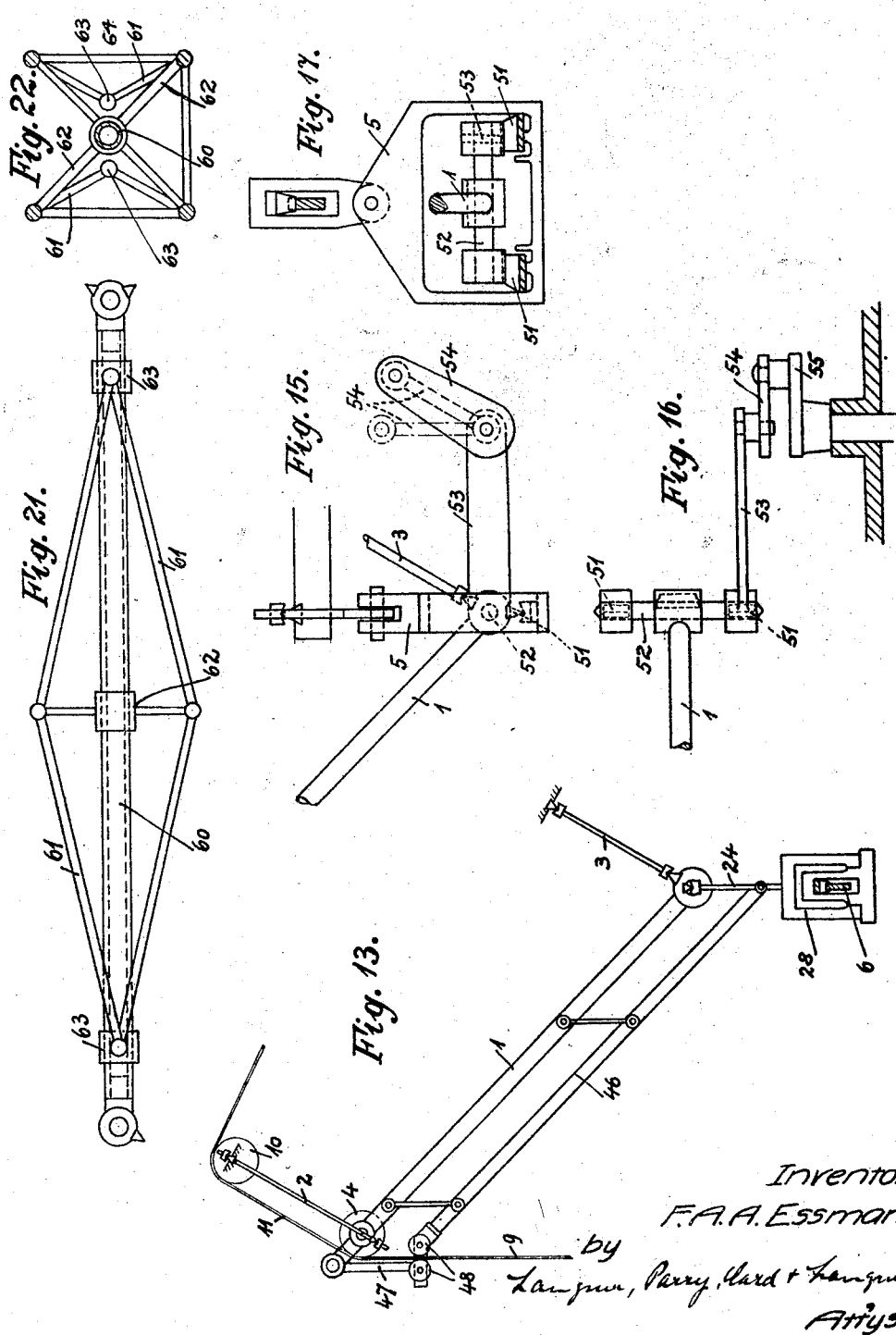

Patented Sept. 29, 1925.

1,555,239

UNITED STATES PATENT OFFICE.

FRIEDRICH AUGUST ALBERT ESSMANN, OF ALTONA-OTHMARSCHEN, GERMANY.

WEIGHING DEVICE.

Application filed July 23, 1923. Serial No. 653,324.

*To all whom it may concern:*

Be it known that I, FRIEDRICH AUGUST ALBERT ESSMANN, citizen of Germany, residing at Altona - Othmarschen, Moltkestrasse 71, Germany, have invented certain new and useful Improvements in a Weighing Device, of which the following is a specification.

The present invention refers to a weighing device, which is particularly used when the load to be weighed will be at a distance from that part of the weighing apparatus which indicates the weight. The device can be combined with a lifting apparatus particularly with a crane so as to indicate the weight of the load when removed from one place to another. More particularly the weighing device is suitable for slewing cranes, in which, owing to the gib, there is always a large distance between the load and the indicating part of the weighing apparatus.

In comparison to devices for the same object the present weighing device has the advantage of greater simplicity nevertheless enabling very accurate weighing. Another essential advantage consists therein that, for instance, the gib of the slewing crane is strained only to a very slight degree.

The essence of the invention consists therein that a rod, which as the case may be is lying either horizontally or at an angle and is guided on both ends by links, which engage either by resting against or being attached to fixed parts of the weighing device or of the lifting device respectively, acts on a weighing beam while being itself acted upon directly or indirectly by the load to be weighed. Since this rod thus carries the load to a certain extent, in the case of the slewing cranes only one component of the tensile strain of the rope will act on the gib so that this will be relieved to a corresponding extent.

The weighing device according to the present invention can be suspended in swimming or floating cranes in such manner that it always retains its vertical hanging position in spite of the inclinations of the gib, caused by the load and the slanting position of the latter with regard to the vertical transversal plane of the crane ship, and therefore is not changed with regard to its effect, when the position of the crane ship is altered.

In cranes with a travelling crab or trolley the rod is arranged parallel to the way or rail of the crab, and the load acts directly or indirectly at right angles to the rod at any place of its length. In this case the rod itself can form the way or track of the crab or trolley. In greater plants a special way or rail is provided for the crab, and by special means only one part of the load is allowed to act on the rod.

The invention can be carried out in many ways, some of which are diagrammatically illustrated in the accompanying drawings.

Fig. 1 illustrates diagrammatically the slewing crane in elevation having a weighing device, in which the link is horizontal, and in which the deflection pulley is situated at the lower end of the gib.

Fig. 2 is a similar view, the deflection pulley being arranged at the head of the gib.

Fig. 3 is a diagrammatical view of the slewing crane in elevation having a weighing device, the gib lying rather flat and the links at rather steep angles.

In Fig. 4 the gib is shown for itself in connection with the links and a number of intermediate links of the construction shown in Fig. 3.

Figs. 5 and 6 are further diagrammatical views of modifications, in which the load pulley is pivoted to a special carrier supported at the upper end of the rod.

Fig. 7 is a diagrammatical elevation of a slewing crane, in which the load is transmitted to the weighing beam by tensile strain of the rod.

Fig. 8 is the diagrammatical elevation of the floating crane having a weighing device with means for allowing a correct weighing even in slanting positions of the crane ship.

Fig. 9 is an end view of the weighing means shown in Fig. 8.

Fig. 10 is a diagrammatical side view of the travelling crab crane with a weighing device.

Fig. 11 is a side view of a device for compensating the different transmissions of the load to the weighing device owing to the changes of the position of the loaded rod and the loaded link, the spring used in connection with this device being arranged below the upper end of the rod.

Fig. 12 is a plan of the device shown in Fig. 11 with the difference that the spring is arranged above the links.

Fig. 13 is a side view of the device, which can be used in combination with the floating crane shown in Fig. 8, and adapted to prevent the swinging of the load with regard to the vertical plane of the gib from influencing the weighing.

Fig. 14 is a device having the same object as the device shown in Fig. 13 to be combined with a slewing crane having a link arranged below the upper end of the rod.

Fig. 15 is a side view of the device for cranes with a vertical gib for holding the knife-edge on the lower end of the rod and adapted to support one part of the weighing apparatus in proper position when the gib is lowered.

Fig. 16 is a plan view, and

Fig. 17 an end view of the device shown in Fig. 15.

Fig. 18 is a detail view of the load pulley and its shaft projecting into the walls of the gib in a position when the weighing device is released and the rod is lowered.

Fig. 19 is a plan view of the device shown in Fig. 18, and

Fig. 20 is a detail view of the device shown in Fig. 18.

Fig. 21 is an elevation of the rod stiffened by stays.

Fig. 22 is an end view of the means shown in Fig. 21.

Fig. 23 is a detail view showing a modified way of connecting the links to the rod.

In the slewing crane shown in Fig. 1 a rod 1 is guided on the head of the gib A by a horizontal link 2, and at the bottom where the operator stands by a horizontal link 3, the upper end of the rod 1 carrying the load pulley 4 and the links engaging the rod and fixed parts of the gib by knife-edges and pans. The lower end of the rod 1 engages the suspension rod 5 of the scale beam 6 which is suspended oscillatory, and is connected with the running scale beam 8 by a bar 7. When the rope 9 is loaded the rod 1 is compressed by the load, and the link 2 is tensioned. The lower end of the rod being supported by the link 3 in such manner, that it only can move downwards, causes a tensile strain on the suspension rod 5, and thus by the movement of the rod transmits the load with decreased power to the weighing beam 8. The load carrying rope 9 is passed under the deflecting pulley 10 arranged at the lower end of the rod to the winch. The deflection pulley 10 is so arranged that that part of the rope which runs to the winch has such position that, owing to the downward movement, there will be no additional pull nor a slack on the rope, that might injure the correctness of the weighing operation.

The crane shown in Fig. 2 differs from that described above only inasmuch as the deflection pulley 10 is arranged at the head of the gib A in such manner that, owing to the position of that part of the rope which is just running off from the load pulley, it causes no additional movement of the rope when the load pulley has a downward movement.

In the crane shown in Fig. 3 the deflection pulley 10 is also arranged at the head of the gib A; however, the links 2 and 3 as well as that part 11 of the rope which comes from the pulley 4 are not horizontal but are lying at an angle. This modification will be suitable for cranes in which the gib A is not steep but arranged comparatively flat with regard to the horizontal plane. If in such cranes the link 2 guiding the deflection part was arranged horizontally the pressure of the rod 1 caused by the load would be so great, that it would have to be constructed in dimensions that would make its application difficult. Owing to the position of the rod 1 and the deflection part 11 of the rope the link 2 will be compressed and correspondingly the link must be placed intermediate of the two knife-edges. To prevent the upper end of the rod 1 from falling down, when the rope is slackened or loaded insufficiently the two ends of the shaft of the pulley 4 project into openings in the side walls of the gib with a certain amount of play.

When the gib is very long, as is the case particularly in cranes having a flat lying gib, the rod 1 will have a great length correspondingly. In order to give such a rod a comparatively light weight, even if it is constructed as a tube, there may be a special means to prevent sidewise bending. Such means are shown in Fig. 4 consisting of a number of intermediate links 12, which are parallel to one another, and may be parallel to the links 2 and 3. These intermediate links 12 may be so constructed that the rod cannot give way to the side.

In the cranes shown in Figs. 5 and 6 the load pulley is not arranged at the end of the rod 1 itself but on the free end of a special carrier 13 supported rotatably by the rod 1. By the link 14, which with one end engages the knife-edge 15 attached to the gib A, and with its other end engages a knife-edge on the upward prolongation 131 of the carrier 13, and moreover by the compressed link 2, the carrier 13 is so held, that it transmits the load to the rod 1. The deflection pulley 10 is here arranged on the gib A. In the crane shown in Fig. 5 the deflection pulley is so arranged and the carrier 13 is so supported by the fixed knife-edge 15 that the load pulley 4 and the deflection pulley 10 are at the same height, and the deflection part 11 of the load as well as the links 14 and 2 are horizontal. In the crane shown in Fig. 6 the deflection pulley 10 is journaled on the gib, and the carrier 13 is engaged by the fixed knife edge 15 in such a manner that the deflection pulley is situated higher than the load pulley. Correspondingly the links 14 and 2 and the deflection part 11 of the rope are inclined. The inclined position is necessary for the same reason as it is necessary for the construction shown in Fig. 3, since the gib shown in Fig. 6 has only a very acute angle with regard to the horizontal plane. The inclined arrangement of the carrier 13 and the link makes it possible that the rod 1 might even be arranged horizontally. Such construction of the weighing device is applicable in cranes with flat or horizontal gibs.

The weighing devices shown in Figs. 5 and 6 are particularly suitable for cranes that have no parts that project beyond the crane profile, since the rod 1 is placed within the gib A.

In Fig. 7 a crane is shown in which the transmission of the load to the weighing beam 8 is carried out by the rod 1 not by compression but by tension. The load pulley 4 is carried by a suspension rod 16 suspended from a beam 17 supported on the head of the gib A. The deflection pulley 10 is arranged on the gib in the same height as the load pulley 4, and the latter is held against sidewise giving way towards the deflection pulley by the compression link 18. A link 19 which is attached with one end to the gib and with its other end to the suspension rod 16 prevents a lateral pressure acting against the knife-edge of the beam 17, owing to the friction of the load pulley 4. The rod 1 is connected at its upper end to a suspension rod 20 which engages the second arm of the beam 17. The link 2 which is submitted to a tensile strain permits only a movement of the end of the rod 1 in the longitudinal direction of the suspension rod 20. The other end of the rod 1 is connected with the link 21 of the weighing beam 6 and is guided by the link 3, which is subjected to a tensile strain in such manner that it can only move longitudinally to the link 21, that is to say in vertical direction. The load to be weighed causes a pull in the rod 1, which pull is transmitted finally to the weighing beam 8 proper.

In a floating crane the arrangement of the weighing device is such that even in a laterally overhanging position of the gib with regard to the vertical central plane owing to the alterations of the position of the crane ship the weighing device will still operate correctly, Figs. 8 and 9. The deflecting pulley 10 is journaled in a frame 22, which is rotatably attached within the gib A by pivots 23, the axes of which are in or about in the centre line of the gib. The load pulley carried by the rod 1 and placed lower than the deflecting pulley, is supported against the deflecting pulley by the inclined link 2 in a similar manner as is described with reference to Fig. 3. The lower end of the rod 1 engages a suspension rod 24 and is guided by the link 3. The link or links 3 (Fig. 9) bear against a knife-edge 25 which is attached to the carrier 26. The latter is suspended at right angles to the central plane of the gib A rotatably on the shaft 27, which is so attached to the gib A, that its central line is a prolongation of the pivot pins 23. At the free end of the carrier 26 the frame 28 is rotatably suspended on the shaft 29, which carries the weighing beam 6 and the weighing beam 8. The central line of the shafts 29 of the beam 28 approximately falls together with the supporting knife-edge line of the rod 1, in which the rod rests on the upright rod 24. This upright rod engages with its lower end the beam 6, so that the load is transmitted by the rod 1 to the weighing beam 8, as was the case in the former described constructions.

When the crane ship tilts to one side owing to the gib being loaded the frame 28 will retain its vertically hanging position owing to its rotatability about the shaft 29, so that also the weighing beam 6 and the weighing beam 8 retain their proper position. When the crane ship is tilted from front to back or vice versa, and the gib is brought into a more or less inclined position the carrier 26 will rotate together with the frame 28 about the shaft 27, and also the load pulley 4 will retain its position vertically with regard to the deflection pulley owing to its being journaled in a frame 22 rotatable about the pivot pins 23. The upright central plane of the complete weighing device therefore retains its vertical position in all inclined positions of the crane ship longitudinally or transversally, and in all positions of the gib.

The weighing device constructed according to the present invention is also applicable for all such lifting apparatus in which the load is moved along by a travelling crab or trolley. In this case the rod is guided in longitudinal direction of the path of the crab horizontally by parallel inclined links oscillating up and down, and the rod transmits the power to a weighing lever by its up- and down- movement. The rod will be subjected to the action of the load to be weighed by the fact that according to the position of the crab a pressure is exerted on the rod transversally, so that the rod oscillates parallel to its place of rest downwardly. If the way or stroke of the crab is very short, and the maximum load is small, the crab can be arranged directly on the rod and moved along the same. However, in order to avoid great bending strains of the compression rod and too large burdening of the links and its own connection with the rod and the carrier it is advisable, and even for long ways of path of the crab and for great loads necessary that not the complete load to be weighed but only one part of the load is allowed to act on the rod. This object in view the crab or trolley is arranged in the usual way on a yielding or springy rail or track, and a device is suspended therefrom on which the load hangs, and which is provided with means that transmits the reduced weight of the load to a roller or the like resting on the rod.

A weighing device constructed in this manner is illustrated diagrammatically in Fig. 10. A crab or trolley 32 is adapted to run on a track or on rails 31 arranged in a horizontal beam or structure 30. Below the track 31 the rod 1 is placed in horizontal position and carried by the links 2 and 3 pivotally attached to the structure 30 at suitable places. In this case the rod 1 is strengthened by stays 33. One end of the rod 1 is connected by a bar 5 with the weighing beam 6, and is held by the latter in a raised position in which the links 2 and 3 are standing at an angle as is shown in Fig. 10. By the aid of bolts 34 a casing 35 is suspended from the crab 32. A weighing beam 36 journaled in the casing 35, carries by a suspension rod 5* the load pulley 4. Within the casing 35 a second weighing beam 37 is journaled, which engages the weighing beam 36 by the aid of a suspension rod 5°. The weighing beam 37 is engaged by a suspension rod 38 carrying at its upper end vertically over the pulley 41 a roller 39, running on the rod 1. By the aid of the link 40, which at one end is connected with the rod 38 and at its other end with the casing 35 the turning to one side or running off of the roller 39 from the rod 1 is prevented without causing any friction. The load rope 9 is guided from the load pulley 4 to the deflection pulley 10 journaled in the casing, from the latter to the pulley 41 journaled on the bolt 34, and from here to the guiding pulley 42 at the end of the beam or structure 30 and finally to the winch. The pulley 41 and the pulley 4 have the same diameter and their axes are lying in a vertical line. The load pulley 4 will be prevented by the link 43, which engages its suspension rod 5*, from yielding laterally, when a pull is exerted on the rope towards the deflection pulley 10. The roller 39 thus presses with a power of the load considerably reduced by the weighing beams 36 and 37 the rod 1 while the load and the weight of the crab 32 will be carried by the rails 31. The pressure of the roller 39 on the rod 1 is always the same in all positions of the crab and is not changed by any alteration of the point of attack of the roller on the rod.

In such weighing devices, in which the rod is subjected to pressure or to a tensile strain the length of the rod and of the links 2 and 3 is not constant owing to the elasticity during the loading. These alterations in the length of the rod and of the links will have the effect that the angle which the rod forms with the link will be also changed. The angle, owing to the changes of the length will be greater when, as is the case with the described constructions, the link is above the rod 1, and will be smaller when the link 2 is arranged below the rod. The latter will be true with regard to the construction shown in Fig. 11. By the change of the angle the parallelism of the links 2 and 3 will be disturbed and destroyed, and thus also the correct influence on the weighing beams will be hindered, so that the weighing machine will indicate correspondingly incorrect. If the angle is increased there will be a reduction of the effective load, and if the angle is decreased the load on the weighing beam will be increased. To avoid this drawback in transmitting the load to the scale in such cases in which the angle increases, and in which there is an upper deflection pulley 10 the link 2, as is shown in Fig. 12, can have its supporting point in the axis of the latter, and the deflecting pulley 10 can be carried by springs 44. The spring 44 is so dimensioned, that on loading the pulley 4 a downward movement of the deflecting pulley is allowed to such an extent, that in spite of the lowering of the load pulley, owing to the changes of the length of the rod 1 and the links 2 the parallel position of the latter to the lower link 3 is retained. At the same time hereby also the parallelism of the rope part 11 to the link 2 will be obtained as is necessary for the correct transmission of the weight. For preventing a great friction the deflection pulley 10 is guided by links 45 free from friction which prevent any yielding of this roller towards the load pulley 4.

In the construction shown in Fig. 11, the link 2 is inclined downwardly under the rod, forming an angle which decreases on a change of position due to any increase in length. The tendency to increase the load on the weighing beam accruing from such change will be prevented by the fact that the rod is so acted upon by the spring 44 that the increasing part of the pressure will be relieved from the weighing beams. With this object in view the spring 44 is allowed to act on the rod 1 in such direction preferably near the load pulley that it counteracts the lowering of the latter. When not operated upon the pressure of the spring is balanced by a weight of any lever or beam of the weighing device in such manner that the weighing beam will come to rest at its zero position.

When the crane gib is not standing at a steep angle but is lying flat it is necessary that the links 2 and 3 have an inclined position, as is the case with the constructions shown in the Figs. 3, 6 and 8. When the link 2 is in an inclined position the swinging or oscillation of the load in the vertical plane of the gib about the pulley 4 has an influence on the weighing device. This will be understood from the fact that, when the swinging of the load towards outside is so great that the rope adjusts itself up to a straight line with the rope part 11 or parallel to the link 2 the rope 9 would not burden the rod 1 at all, and the latter would not influence the weighing scale. The swinging of the load would have the result that the complete weighing lever or weighing beam swings up and down with great force.

In the construction shown in Figs. 13 and 14 the swinging of the load will be without effect or almost without effect. The construction shown in Fig. 13, which may be applied to a floating crane, as shown in Fig. 8, consists of a rod 46 suspended under the rod 1 and parallel thereto at one end by the aid of a suspension rod 47 at the upper prolonged end of the rod 1, while the other end is connected rotatably to the rod 24, against which the lower end of the rod 1 rests, Fig. 8. The upper end of the rod 46 carries below the pulley 4 two rollers 48 which engage the rope 9 between them. When now the load swings the rod 46 will be taken along by the swinging rope 9, and thereby the rods 47 and 24 will be adjusted parallel to the direction of the rope. Together with the rod 24 at the same time the frame 28 (which as well as the rods 47 and 24 is shown abbreviated in Fig. 3) swings with the weighing beams 6 and 8 about the shafts 29, Fig. 8, into the parallel position, so that the swinging of the load does not alter the transmission of the load or power to the weighing lever or weighing beam.

In the construction shown in Fig. 14 which is particularly adapted for fixed cranes, that is for cranes used on the land, the link 2 is also arranged at an angle but below the rod 1. For reducing the effect the oscillations of the load might have on the weighing device, the pulley 4 is suspended from the upper end of the rod 1 by a suspension rod 49, and the deflection pulley 10 is so situated that the part 11 of the rope between the two pulleys is also horizontal. The horizontal draft on the load pulley 4 will be taken up by the horizontal link 50 against which the load pulley bears laterally.

In cranes having a gib that can be lowered or raised the connection of the lower end of the rod 1 with the weighing suspension rod 5 and the link 3 must coincide with the axis of rotation of the gib. Moreover, it must be avoided that on the lowering of the rod 1 together with its gib its knife-edge engaging the suspension rod 5 can oscillate laterally, whereby the knife-edges would escape sideways from the pans of the suspension rod. These knife-edges must be held in engagement with the pans normally when the rod 1 is lowered. Means having this object in view are shown in Figs. 15, 16 and 17. The two knife-edges 51 are mounted on the ends of the shaft 52 which is rotatable on the lower end of the rod 1. The shaft 52 carries an arm 53 engaging with its end a link 54. This link is held parallel to the link 3 by an arm 55, which is pivoted to the frame of the crane and connected with its free end with the link 54. By these means the weighing machine moves freely. The arm 53 will come into such a position that the knife-edge 51 will always engage its pan properly. The arm 55 will be positively moved when the gib is lowered in such a way, that the link 54 is moved in the same manner as the link 3 on the lowering of the gib, and thus will always be held parallel to the link 3. The result is that on the lowering of the gib the arm 53 will retain its position unchanged and the knife edge 51 will be held in engagement with the pans.

It is necessary that the weighing apparatus can be relieved. This is done by lowering the suspension rod carrying the weighing beam 6. Thereby the members 6, 5, 3, 1 and 2 will be lowered, and in the crane, shown in Fig. 1, the shaft of the load pulley 4, having considerable play within the opening in the side walls of the gib, will engage these walls of the gib on both sides. In order to avoid that on this engagement of the shaft of the pulley its knife-edges for the link 2 be injured the places of engagement of the pulley shaft 56 in the opening 56° of the walls 57 of the gib are constructed as inclined faces 58, as may be gathered from Figs. 18 and 20, and the inclination of these faces is such that on their engagement the shaft 56 slides down, and the knife-edges 59 will be moved out of engagement with their pans laterally.

It is advisable to give the rod 1 as little weight as possible though it must have the necessary strength. This condition will be fulfilled in the rod shown in the Figs. 21 and 22. In this modification the rod is formed by the tube 60 and of stays 61 preferably four, as shown. These stays rest on the ends of the four arms of a cross piece 62 arranged in the middle of the tube 60. The ends of the stays 61 are attached to annular clamps 63 which are firmly clamped or mounted near the ends of the tube 60. The ends of the arms of the cross piece 62 are connected with one another by rods 64 to prevent the arms from being bent against one another.

In cases in which the links are subjected to tensile strains they may be connected firmly, for instance, by rivets, as shown in Fig. 23, instead of engaging pans by knife-edges. Even in such cases no injurious friction will arise, since, as is known, a slight lifting off or bending of a thin or springy rod from its normal position will require very little power. It is of advantage to make use of such link arrangement in which on each side of the load roll 4 journaled on the rod 1 thin parallel steel bands 2° are arranged, Fig. 23, which with one of their ends are attached to the gib A, and with their other ends to the cross piece 4° mounted loosely on the shaft of the pulley 4, so that above and below of this shaft there is one steel band.

The springy links have the advantage, that they form a good but yielding connection between the parts, while the connection consisting of pans and knife-edges are only loose. The springy link arrangement is particularly suitable for the slewing crane- and travelling crab-weighing appliance.

I claim:

1. The combination in a combined weighing device and a load lifting device, of a rod, a weighing beam, a connection between the rod and the weighing beam, links engaging fixed parts of the combined device with one end, and the said rod with the other end, so as to guide the rod, the rod being arranged to be moved upon the load being raised, and thereby to transmit power to the weighing beam.

2. The combination in a combined weighing device and a load lifting device, of a weighing beam, a rod weighted by the load at one end and connected to the weighing beam at the other end, links engaging fixed parts of the combined device with one end, and the said rod with the other end, so as to guide the rod, which rod is arranged to be moved, upon the load being raised, and thereby to transmit power to the weighing beam.

3. The combination in a weighing device, a crane, of a gib on the crane, a winch, a load pulley at the upper end of the gib, a weighing beam, a rod, a link engaging the upper end of the rod and connected with the top of the gib, a second link engaging the lower end of the rod and connected with the bottom of the gib, a deflection pulley for guiding a load rope intermediate the load pulley and the winch, a connection between the rod and the weighing beam, the said rod being weighted at one end with the load, and transmitting power to the weighing beam.

4. The combination in a combined weighing beam and a crane, of a weighing beam, a crane, a gib on the crane, a load pulley at the upper end of the gib, a rod weighted by the load pulley, a deflection pulley journalled on the gib, a load rope for carrying the load and running over the said pulleys, links positioned parallel to the rope and between the said pulleys, the links engaging fixed parts of the combined device with one end and the said rod with the other end, so as to guide the rod, a connection between the rod and the weighing beam, the rod being positioned to be moved, upon the load being raised, and thereby to transmit power to the weighing beam.

5. The combination in a combined weighing beam and a crane, of a weighing beam, a crane, a gib on the crane, a load pulley at the upper end of the gib, a rod weighted by the load pulley, a deflection pulley journaled on the gib and at the same level as the load pulley, horizontal links engaging fixed parts of the combined device with one end, and the said rod with the other end, so as to guide the rod, a connection between the rod and the weighing beam whereby the rod is arranged to be moved upon the load being raised, and thereby to transmit power to the weighing beam.

FRIEDRICH AUGUST ALBERT ESSMANN.